June 30, 1964  R. W. BERRY, JR  3,138,847
SADDLE SEAT FOR MILLING CUTTERS
Filed Aug. 24, 1962  3 Sheets-Sheet 1
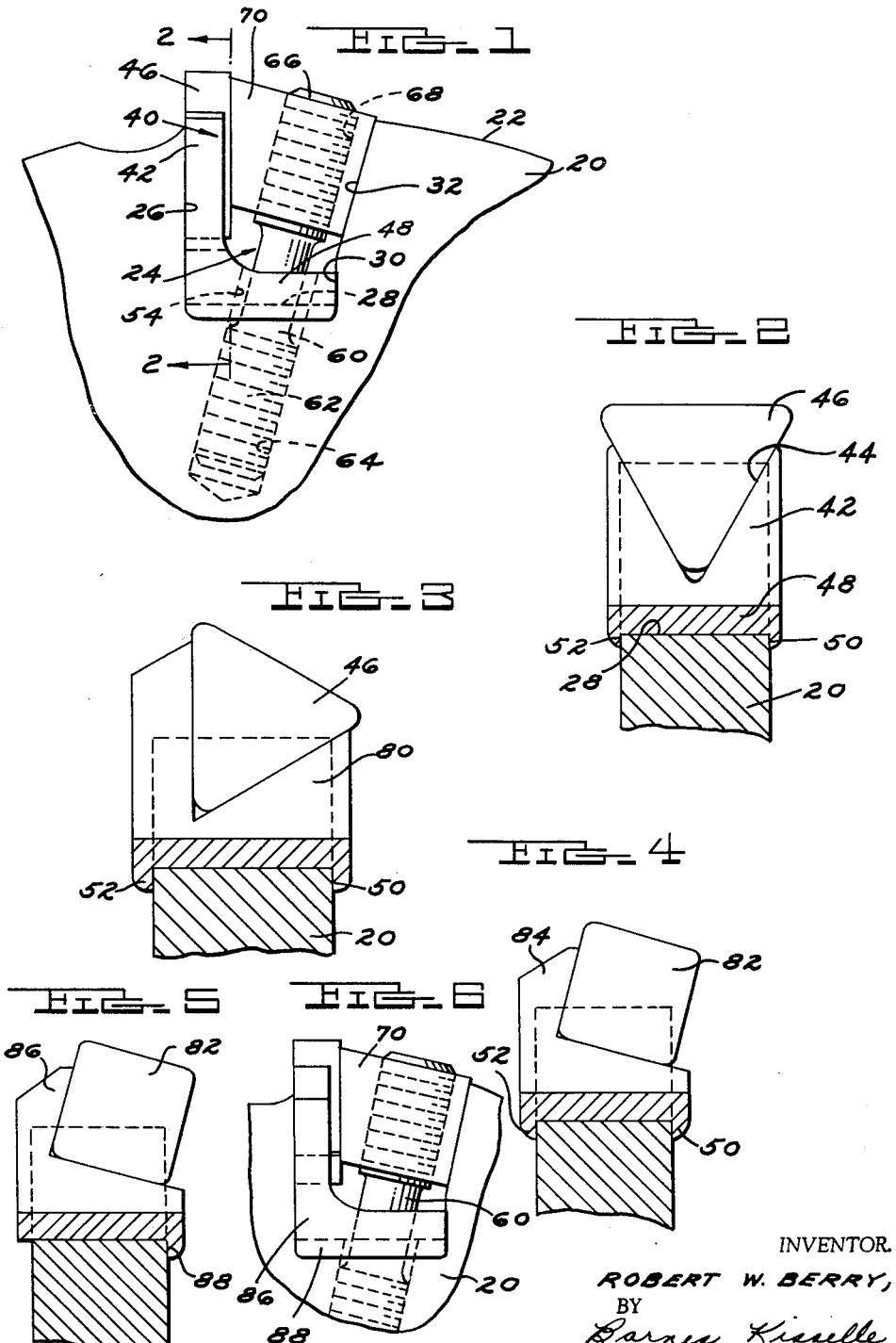
INVENTOR.
ROBERT W. BERRY, JR.
BY
Barnes, Kisselle,
Raisch & Choate
ATTORNEYS June 30, 1964 R. W. BERRY, JR 3,138,847
SADDLE SEAT FOR MILLING CUTTERS
Filed Aug. 24, 1962 3 Sheets-Sheet 2

INVENTOR.
ROBERT W. BERRY, JR.
BY
Barnes, Kisselle, Raisch & Choate
ATTORNEYS

June 30, 1964   R. W. BERRY, JR   3,138,847
SADDLE SEAT FOR MILLING CUTTERS
Filed Aug. 24, 1962   3 Sheets-Sheet 3
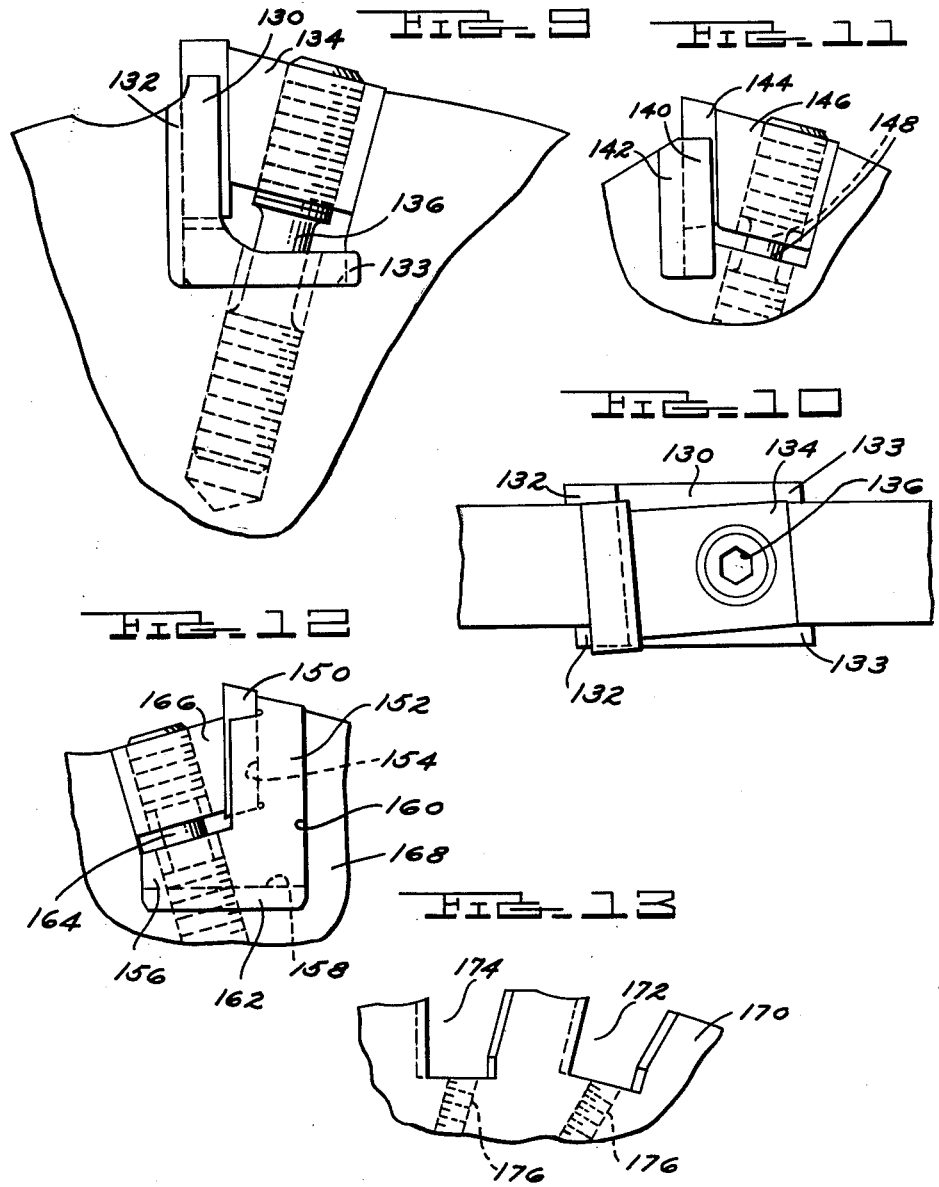
INVENTOR.
ROBERT W. BERRY, JR.
BY
Barnes, Kisselle, Raisch & Choate
ATTORNEYS

United States Patent Office 3,138,847
Patented June 30, 1964

3,138,847
SADDLE SEAT FOR MILLING CUTTERS
Robert W. Berry, Jr., Ferndale, Mich., assignor, by mesne assignments, to Fansteel Metallurgical Corporation, Chicago, Ill., a corporation of New York
Filed Aug. 24, 1962, Ser. No. 219,320
5 Claims. (Cl. 29—105)

This invention relates to a milling cutter and particularly to that type of milling cutter wherein a so-called throwaway type of cutting insert is used. Reference is made to the Begle Patent No. 2,690,610, wherein this general type of cutter slot construction is shown.

It is an object of the present invention to provide a milling cutter construction which is simplified with respect to the openings that must be cut directly into the cutter body and which is provided with locating means for an insert which can be readily positioned and locked on a cutter body in the apertures provided therefor.

It is a further object of this invention to provide a means of making cutters of the described throwaway type with accurate insert locating means which are substantially narrow in cross section, such as side mills, half side mills and slotting cutters.

It is essential that a device of this kind be such that the insert is located accurately circumferentially and radially as well as axially of the milling cutter. Once the insert is located properly, it can be locked in place in a manner which will also tend to lock the locating device in position, thus insuring accurate positioning of the insert at all times.

Other objects and features of the invention relating to details of construction and operation will be apparent in the following description and claims.

Drawings accompanying the disclosure and the various views thereof may be briefly described as:

FIGURE 1, a side view of an assembled locator and insert in a milling cutter body.

FIGURE 2, a sectional view on line 2—2 of FIGURE 1.

FIGURES 3, 4 and 5, modified sections similar to FIGURE 2 showing varying shapes and locator shapes.

FIGURE 6, a side view of the modification shown in FIGURE 5.

Figure 7:
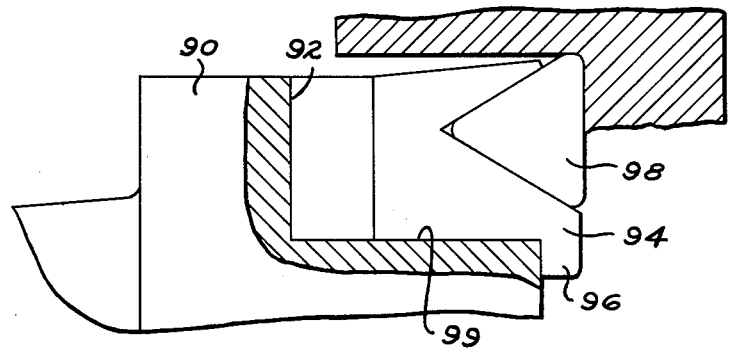

FIGURE 7, a view of a modified locator utilizing axial positioning.

Figure 8:
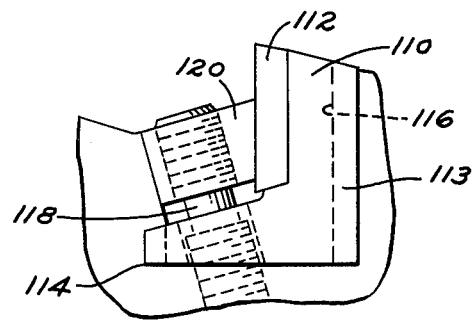

FIGURE 8, another modification showing end location for an insert holder with an anvil body.

FIGURE 9, a further modification of the insert holder, having the locating mechanism for the holder positioned radially.

FIGURE 10, a plan view of the modification shown in FIGURE 9.

FIGURE 11, a simplified locator in a single plane.

FIGURE 12, a view of a modified locator providing a heavy back-up wall for an insert.

FIGURE 13, a view of a milling cutter showing the slots in which the locator, the insert and the locking means are positioned.

Referring to the drawings:

A milling cutter body 20 having an outer periphery 22 is shown with a recess 24 cut axially therethrough, the shape of the recess comprising a relatively straight side 26 at right angles to a bottom surface 28 which terminates at a short surface 30 parallel to surface 26 and running out to the periphery again in an angled surface 32.

An L-shaped locator element 40 has one leg 42 which lies adjacent the surface 26, this leg having a through notch 44 to receive a triangular insert 46. The other leg 48 of the locator 40 lies along the bottom surface 28 of the recess 24 and this leg has two flanges 50 and 52 which span the axial dimension of the body 20 to lie on either side thereof and thus position the locator 40 axially. The bottom leg 48 also has an opening 54 for a double threaded screw 60 having one end 62 threadingly engaging the body 20 in a suitable tapped recess 64 and the other end 66 threadingly engaging a tapped recess 68 in a locking wedge 70, one side of the wedge engaging surface 32 and the other side engaging a flat surface of the insert 46. Screw 60 is preferably a differentially threaded screw which lifts the wedge 70 out of its recess when turned in a counterclockwise direction and which forces the wedge into locking position when turned in a clockwise direction.

Thus, it will be seen that when the locator unit 40 is positioned in the opening 24, it cannot shift axially, and when the wedge is brought down against the insert 46, it also brings a radially inward force against the locator, thus positioning all of the parts positively. On the other hand, the recess in the cutter body 20 is very readily formed by a straight pass through the body, and the recess in locator 40 is similarly formed in a straight pass.

In FIGURE 3, a triangular insert 46 is shown in a modified locator element 80 again with the side flanges 50 and 52 serving to locate on the body 20. In FIGURE 4, a square insert 82 in a locator 84 is similarly positioned. In FIGURES 5 and 6, a modification is shown wherein a square insert 82 is held in a modified locator 86 wherein one flange 88 on the right-hand side is used. The same wedges would be used as shown in FIGURE 6. The advantage of the construction shown in FIGURES 5 and 6 lies in the fact that with the single flange 88 a radial location can be obtained without a critical dimension between opposed flanges such as in FIGURES 2 and 4. A little more care is require to set the locator element axially prior to the tightening of the wedge but once the tightening is accomplished, the parts are locked in position.

In FIGURE 7, a body 90 has a recess 92 holding a locator 94 which has a side extension flange 96, the locator holding a triangular insert 98; a side wall 99 provides a radial location for the locator 94.

In FIGURE 8, an L-shaped locator 110 holding a positive insert 112 is located in the tool body by lips 113 and 114 on opposite sides of the receiving recess 116. A screw 118 holds a locking wedge 120 against insert 112.

It will be noted that the recess 122 for insert 112 is formed in the body 112 but the body forms an anvil back-up for the insert and in some heavy duty work this is desirable.

In some cases, it may be desirable to place the locating flanges as shown in FIGURE 9 where a locator element 130 has opposed locating flanges 132 and 133 held in place by a wedge 134 actuated by a screw 136. FIGURE 10 is a plan view of the assembly of FIGURE 9.

In FIGURE 11, a modification is shown wherein the locator element 140 has locating flanges 142 extending laterally but in this case the locator element is not an L-shaped unit but is simply a polygon provided with the necessary recess to hold the insert 144. A wedge 146 held by a screw 148 completes the assembly.

In FIGURE 12, a modification is shown where again it may be desirable to have an anvil backing for an insert 150. In this case, the L-shaped locator has one leg 152 provided with a recess 154 and another leg 156 lying along the base surface 158 of the opening 160 utilizing the locating flanges 162 all held in place by a screw 164 acting on wedge 166. In this instance, the insert 150 is backed by a fairly substantial thickness of the locator which can also serve as an anvil providing a solid back-up for the insert and protecting the body 168.

In FIGURE 13, the body 170 is shown having the slots 172 and 174 which are straight passages through the body, the tapped recesses 176 providing the anchorage for the holding screws.

It will be understood that the locating elements described can be machined but they may also be formed by other methods, such as casting, forging, powdered metal pressing, etc. which in high production will reduce the cost and provide a satisfactory element.

I claim:

1. A rotary cutting tool having a plurality of recesses for receiving indexable pellet-type cutting elements and a locating and locking assembly for said inserts which comprises in combination,
   (a) a rotatable body having peripheral recesses each with a base and a forward wall and a trailing wall adjoining said base, said recess walls terminating at flat surfaces of said rotating body,
   (b) a locator to lie in said recess comprising an L-shaped member having one leg of the L to seat on the base of said recess and another leg of the L to extend upwardly in contact with the forward wall of said recess, said second leg having an opening extending therethrough and intersecting at least one edge of said locator,
   (c) means on one of the legs of said locator extending over and in contact with a portion of one of the flat surfaces of said body,
   (d) an insert in the opening of said second leg,
   (e) a locking means adapted to bear against said insert and said trailing wall of said recess to exert pressure against said insert to hold it against said forward wall, and
   (f) means movable to exert locking pressure on said locking means.

2. A cutting tool having a plurality of recesses for receiving indexable pellet-type cutting elements and a locating and locking assembly for said inserts which comprises in combination:
   (a) a movable body having peripheral recesses each with a base and a forward wall and a trailing wall adjoining said base, said recess walls terminating at flat surfaces of said movable body,
   (b) a locator to lie in said recess comprising a member to lie in contact with a wall of said recess and positioned radially by contact with the base of said recess, said member having a recess open to the periphery of said body to receive a polygonal insert in a radial cutting position in face contact with one of said walls, the sides of said recess embracing edges of the insert to locate it axially and radially,
   (c) locating means on said member extending over and in contact with a portion of one of the flat surfaces of said body,
   (d) a polygonal insert in the recess of said locator,
   (e) a locking means adapted to bear against said insert and exert pressure between the walls of said body recess to lock said insert and said locator, and
   (f) means movable to exert locking pressure on said locking means.

3. A device as defined in claim 2 in which the locator comprises an L-shaped member having contiguous flat surfaces with portions thereof matching complemental base and wall surfaces in a recess of said body, and the locating means comprises a projection on at least one side of said block extending beyond one of said surfaces in a direction perpendicular thereto and overlying and in contact with a portion of an outside wall of said body to locate the block in said body.

4. A cutting tool having a plurality of recesses for receiving indexable pellet-type cutting elements and a locating and locking assembly for said inserts which comprises in combination:
   (a) a movable body having spaced recesses each with a base and a forward wall and a trailing wall adjoining said base, said recess walls terminating at outer surfaces of said body,
   (b) a locator to lie in each of said recesses comprising a member located in one direction by contact with a wall of said spaced recesses and positioned in a second direction substantially normal to said wall by contact with the base of said recess, said member having an insert seat open to the outside of said body to receive a relatively thin, indexable pellet-type polygonal insert in a cutting position, at least a portion of the sides of said insert seat opposing each other to embrace edges of the insert to locate the insert in said seat,
   (c) locating means on said member comprising a projection extending over and in contact with a portion of one of the outer surfaces of said body to locate said member in a third direction,
   (d) a polygonal insert in the insert seat of said locator having cutting edges embraced in part by sides of said insert seat and a portion thereof extending beyond said body to contact a workpiece,
   (e) a locking means in each of said body recesses adapted to bear against said insert and positioned to contact the other of said walls of said recess to exert pressure between the walls of said body recesses to lock said insert in said insert seat in said locator, and
   (f) means movable to exert locking pressure on said locking means.

5. A cutting tool having a plurality of recesses for receiving indexable pellet-type cutting elements and a locating and locking assembly for said inserts which comprises in combination:
   (a) a movable body having spaced recesses each with a base wall and opposed forward and trailing walls adjoining said base wall, said recess walls terminating at outer surfaces of said body,
   (b) a locator to lie in each of said recesses comprising a member located in one direction by contact with a first wall of said spaced recesses and positioned in a second direction substantially normal to said first wall by contact with the base wall of said recess, said member having an insert seat open to the outside of said body to receive a relatively thin, indexable pellet-type polygonal insert in a cutting position, said insert seat being positioned to be completed by at least one of said walls,
   (c) locating means on said member comprising a projection extending over and in contact with a portion of one of the outer surfaces of said body to locate said member in a third direction,
   (d) a polygonal insert in the insert seat of said locator having portions thereof projecting to the outside of said body to contact a workpiece and having at least one surface in contact with said one of said walls of said body to locate the insert in one direction,
   (e) a locking means in each of said body recesses adapted to bear directly against said insert and positioned to contact a wall of said recess opposed to said first wall to exert pressure between the first and second walls of said recess to lock said insert in said insert seat in said locator, and
   (f) means movable to exert locking pressure on said locking means.

References Cited in the file of this patent

UNITED STATES PATENTS

| 1,423,192 | Converse | July 18, 1922 |
| 2,325,746 | Curtis | Aug. 3, 1943 |
| 2,584,449 | Hoglund | Feb. 5, 1952 |
| 2,903,783 | Kralowetz | Sept. 15, 1957 |

FOREIGN PATENTS

| 968,404 | France | Apr. 19, 1950 |
| 1,203,472 | France | July 27, 1959 |
| 218,334 | Austria | Nov. 27, 1961 |